(12) United States Patent
Broden et al.

(10) Patent No.: US 9,103,739 B2
(45) Date of Patent: Aug. 11, 2015

(54) SEAL FOR PRESSURE TRANSMITTER FOR USE IN INDUSTRIAL PROCESS

(71) Applicant: Rosemount Inc., Chanhassen, MN (US)

(72) Inventors: David Andrew Broden, Andover, MN (US); Daniel Ronald Schwartz, Hopkins, MN (US); Jonathan Gordon Koehler, Belle Plaine, MN (US)

(73) Assignee: Rosemount Inc., Chanhassen, MN (US)

( * ) Notice: Subject to any disclaimer, the term of this patent is extended or adjusted under 35 U.S.C. 154(b) by 134 days.

(21) Appl. No.: 14/038,993

(22) Filed: Sep. 27, 2013

(65) Prior Publication Data

US 2015/0090039 A1 Apr. 2, 2015

(51) Int. Cl.
*G01L 19/06* (2006.01)
*F16J 15/06* (2006.01)

(52) U.S. Cl.
CPC ............ *G01L 19/0645* (2013.01); *F16J 15/06* (2013.01)

(58) Field of Classification Search
CPC ............ G01L 19/0645; G01L 19/0038; G01L 13/025; G01L 13/026; F16J 15/061
USPC ............................................. 73/706
See application file for complete search history.

(56) References Cited

U.S. PATENT DOCUMENTS

| | | |
|---|---|---|
| 3,974,855 A | 8/1976 | Webb |
| 4,005,848 A | 2/1977 | Eggleston |
| 4,046,010 A | 9/1977 | Akeley |
| 4,136,603 A | 1/1979 | Doyle, Jr. |
| 4,231,546 A | 11/1980 | Eggleston et al. |
| 4,398,194 A | 8/1983 | Johnston |
| 4,572,000 A | 2/1986 | Kooiman |
| 4,798,089 A | 1/1989 | Frick et al. |
| 4,833,922 A | 5/1989 | Frick et al. |
| 4,852,466 A | 8/1989 | Freeman et al. |
| 4,934,193 A | 6/1990 | Hayata |
| 4,993,754 A | 2/1991 | Templin, Jr. |
| 5,094,109 A | 3/1992 | Dean et al. |
| 5,095,755 A | 3/1992 | Peterson |
| 5,165,281 A | 11/1992 | Bell |

(Continued)

FOREIGN PATENT DOCUMENTS

| | | |
|---|---|---|
| CN | 1127355 | 7/1996 |
| CN | 1198813 | 11/1998 |

(Continued)

OTHER PUBLICATIONS

Notification of Transmittal of the International Search Report and the Written Opinion of the International Searching Authority, PCT/US2014/004308, dated Jan. 9, 2015.

(Continued)

*Primary Examiner* — Freddie Kirkland, III
(74) *Attorney, Agent, or Firm* — Westman, Champlin & Koehler, P.A.

(57) ABSTRACT

A pressure transmitter system for measuring a pressure of a process fluid in an industrial process includes a pressure transmitter having a pressure sensor. A process fluid passageway having a circular opening is configured to couple pressure of the process fluid to the pressure sensor. A concentric seal support structure extends around the circular opening comprising an annular recess. An annular stress riser is positioned radially inward from the annular recess. A seal material fills the annular recess and contacts at least a portion of the annular stress riser.

19 Claims, 6 Drawing Sheets

(56) References Cited

U.S. PATENT DOCUMENTS

| | | |
|---|---|---|
| 5,184,514 A | 2/1993 | Cucci et al. |
| 5,230,248 A | 7/1993 | Cucci et al. |
| 5,427,358 A | 6/1995 | Eggleston et al. |
| 5,487,527 A | 1/1996 | Eggleston |
| 5,490,034 A | 2/1996 | Zavracky et al. |
| 5,524,492 A | 6/1996 | Frick et al. |
| 5,578,760 A | 11/1996 | Suzuki |
| 5,922,965 A | 7/1999 | Behm et al. |
| 6,038,961 A | 3/2000 | Filippi et al. |
| 6,050,145 A | 4/2000 | Olson et al. |
| 6,055,863 A | 5/2000 | Behm et al. |
| 6,120,033 A | 9/2000 | Filippi et al. |
| 6,520,020 B1 | 2/2003 | Lutz et al. |
| 6,662,662 B1 | 12/2003 | Nord et al. |
| 6,675,655 B2 | 1/2004 | Broden et al. |
| 7,080,558 B2 * | 7/2006 | Broden et al. ........... 73/706 |
| 7,117,745 B2 | 10/2006 | Broden |
| 7,299,415 B2 | 11/2007 | Opheim et al. |
| 7,578,194 B1 | 8/2009 | Hadjiloucas et al. |
| 7,624,642 B2 | 12/2009 | Romo |
| 7,798,007 B2 | 9/2010 | Dannhauer et al. |
| 7,814,798 B2 | 10/2010 | Filippi et al. |
| 8,015,882 B2 * | 9/2011 | Klosinski et al. ........... 73/756 |
| 8,915,140 B2 | 12/2014 | Romo et al. |
| 2008/0091376 A1 | 4/2008 | Russell et al. |

FOREIGN PATENT DOCUMENTS

| | | |
|---|---|---|
| CN | 101198852 | 6/2008 |
| CN | 101509817 | 8/2009 |
| CN | 102159928 | 8/2011 |
| EP | 0 403 256 | 12/1990 |
| JP | 54-109888 | 8/1979 |
| JP | 55-154453 | 11/1980 |
| JP | 2-280026 | 11/1990 |
| JP | 2002-513148 | 5/2002 |
| WO | WO 96/05493 | 2/1996 |

OTHER PUBLICATIONS

Notification of Transmittal of the International Search Report and the Written Opinion of the International Searching Authority, PCT/US2012/032350, dated Jun. 28, 2012.

Office Action from EP Application No. 12718486.9, dated Jul. 28, 2014.

Office Action from Japanese Application No. 2014-503990, dated Aug. 19, 2014.

Office Action from Chinese Application No. 201280015788.2, dated Aug. 11, 2014.

Rule 161(1) and 162 EPC from EP Application No. 12718486.9, dated Nov. 15, 2013.

Office Action from Chinese Application No. 201420560128.9, dated Nov. 24, 2014.

* cited by examiner

SEAL FOR PRESSURE TRANSMITTER FOR USE IN INDUSTRIAL PROCESS

BACKGROUND

The present invention relates to a process control instrument. In particular, it relates to a pressure transmitter which couples to a process pressure.

Transmitters which sense pressure have a pressure sensor typically coupled to at least one isolation diaphragm. The transmitters typically attach to a flange and include an opening which is aligned to receive process fluid from a passageway in the flange. The isolation diaphragm is positioned in the opening, and isolates the pressure sensor from corrosive process fluids being sensed. Pressure is transferred from the isolation diaphragm to the sensor having a sensing diaphragm through a substantially incompressible isolation fluid carried in a passageway. U.S. Pat. No. 4,833,922 entitled MODULAR PRESSURE TRANSMITTER and U.S. Pat. No. 5,094,109 entitled PRESSURE TRANSMITTER WITH STRESS ISOLATION DEPRESSION show pressure transmitters of this type.

Pressure transmitters frequently include a weld ring positioned within the opening surrounding the isolation diaphragm. The weld ring can be welded to the transmitter body and to the isolation diaphragm, thus securing the isolation diaphragm to the transmitter body. The weld ring can also be used to support a seal, such as an O-ring. When the transmitter is attached to the process flange by an attachment force, such as provided by bolts, the seal and weld ring are compressed against the flange to prevent process fluid from leaking past the opening. Examples of such weld rings are shown in U.S. Pat. No. 5,922,965, to Behm et al., entitled PRESSURE SENSOR AND TRANSMITTER HAVING A WELD RING WITH A ROLLING HINGE POINT, granted Jul. 13, 1999 and U.S. Pat. No. 6,055,863, to Behm et al., entitled PRESSURE SENSOR AND TRANSMITTER HAVING A WELD RING WITH A ROLLING HINGE POINT, granted May 2, 2000 and both assigned to Rosemount Inc.

Some types of seals used in connection with the weld rings are particularly difficult to maintain. For example, a seal comprising Polytetrafluoroethylene (PTFE) can be used as a seal. However, PFTE has a tendency to "cold flow" and lose its shape over time. This can reduce the pre-load force applied to the seal and thereby reduce the effectiveness of the seal.

SUMMARY

A pressure transmitter system for measuring a pressure of a process fluid in an industrial process includes a pressure transmitter having a pressure sensor. A process fluid passageway having a circular opening is configured to couple pressure of the process fluid to the pressure sensor. A concentric seal support structure extends around the circular opening comprising an annular recess. An annular stress riser is positioned radially inward from the annular recess. A seal material fills the annular recess and contacts at least a portion of the annular stress riser.

DETAILED DESCRIPTION OF ILLUSTRATIVE EMBODIMENTS

The present invention provides a seal for use with an industrial process control pressure transmitter which uses a concentric seal support structure. The seal support structure is configured to extend around a circular opening and provide a seal to the opening. The support structure includes a recess area and a stress riser portion. Seal material is configured to reside in the recess area and the stress riser portion is configured to urge the seal material against a process face thereby sealing the circular opening to the process face.

Figure 1:
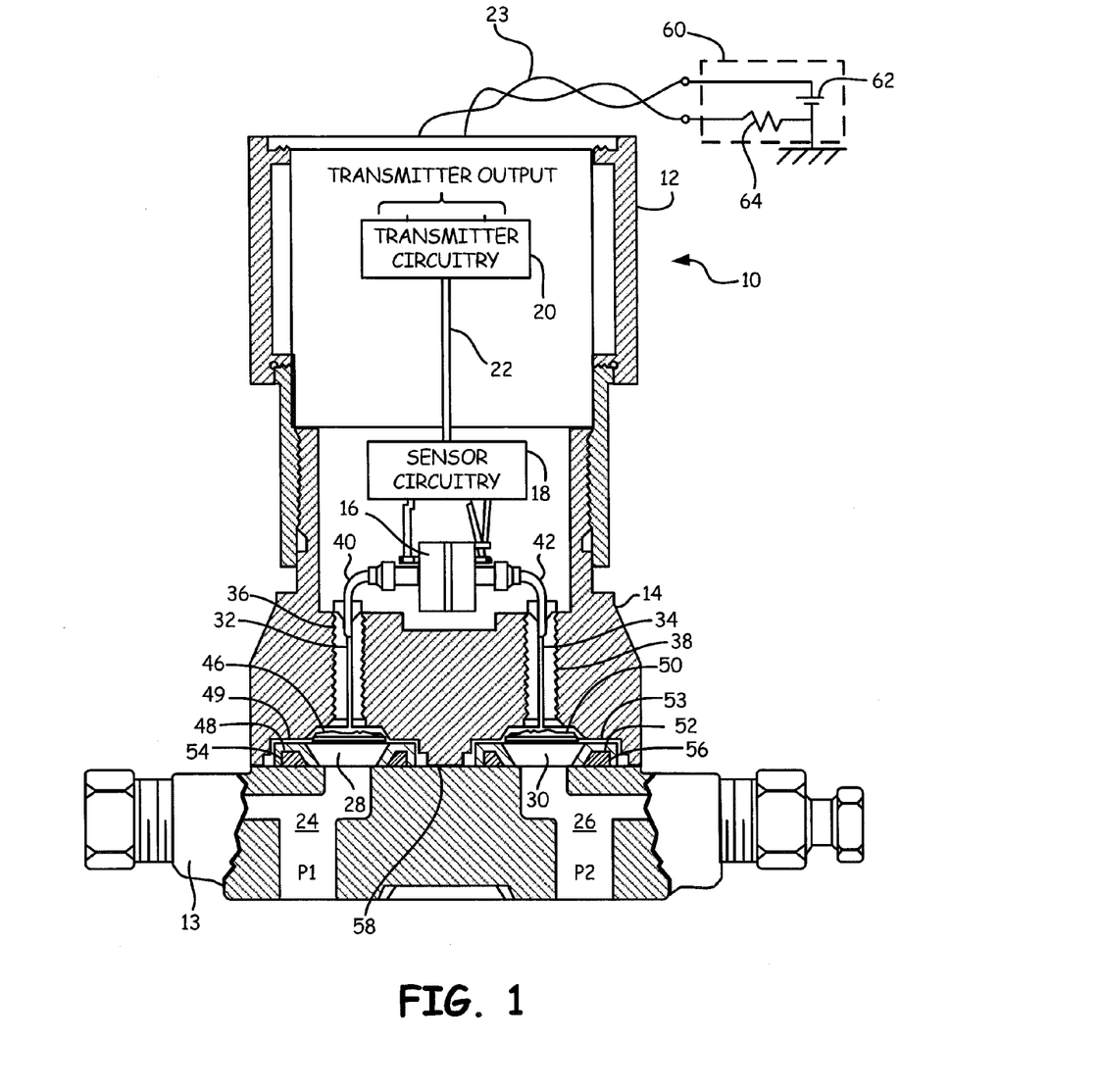
FIG. 1 is a cross-sectional fragmentary view of a pressure transmitter having a weld ring and support surface in accordance with the present invention.

FIG. 1 shows pressure transmitter 10 having transmitter body 12, flange (or coplanar manifold) 13 and sensor body 14 in accordance with the present invention. Although the present invention is shown with a coplanar flange, the invention may be used with any type of flange, manifold, or other coupling adapted to receive process fluid. Sensor body 14 includes pressure sensor 16, and transmitter body 12 includes transmitter circuitry 20. Sensor circuitry 18 is coupled to transmitter circuitry 20 through communication bus 22. Transmitter circuitry 20 sends information related to pressure of the process fluid over a two-wire 4-20 mA process control loop 23. Transmitter 10 transmits information related to the process fluid pressure to control room 60 or to other devices (not shown) coupled to process control loop 23. Process control room 60 is modeled as power source 62 and resistor 64. Transmitter 10 can be completely powered by power received over loop 23. Process control loop 23 can be any type of process control loop including control loops which carry digital information such as those in accordance with the HART® protocol, as well as those which employ wireless communication techniques such as WirelessHART®. However, the present invention is not limited to these communication techniques.

Pressure sensor 16 can be an absolute or a differential pressure sensor. In certain embodiments in which pressure sensor 16 is a differential pressure sensor, sensor 16 measures a difference in pressure between pressure P1 in passageway 24 and pressure P2 in passageway 26 of flange 13. In this particular embodiment, pressure P1 is coupled to sensor 16 through passageway 32. Pressure P2 is coupled to sensor 16 through passageway 34. Passageway 32 extends through coupling 36 and tube 40. Passageway 34 extends through coupling 38 and tube 42. Passageways 32 and 34 are filled with a relatively incompressible fluid such as oil. Couplings 36 and 38 are threaded into sensor body 14 and provide a long flame-quenching path between the interior of the sensor body carrying sensor circuitry 18 and process fluid contained in passageways 24 and 26.

Passageway 24 is positioned adjacent to opening 28 in sensor body 14. Passageway 26 is positioned adjacent to opening 30 in sensor body 14. Diaphragm 46 is positioned in opening 28 and is coupled to sensor body 14 adjacent to passageway 24. Passageway 32 extends through coupling 36 and sensor body 14 to diaphragm 46. Diaphragm 50 is coupled to sensor body 14 adjacent to passageway 26. Passageway 34 extends through coupling 38 and sensor body 14 to diaphragm 50.

Weld ring 48 is positioned within opening 28 and is welded to support surface 49 of sensor body 14. Weld ring 52 is positioned within opening 30 and is welded to support surface 53 of sensor body 14. Weld rings 48 and 52 are typically substantially identical and are preferably annular shaped and positioned within openings 28 and 30 surrounding isolation diaphragms 46 and 50. In some preferred embodiments, the welds used to attach the weld rings to sensor body 14 also attach the respective isolation diaphragms to the sensor body. Weld rings 48 and 52 can also be used to support a seal for sealing openings 28 and 30 to prevent process fluid from passageways 24 and 26 from leaking. As illustrated, weld rings 48 and 52 support seals 54 and 56, respectively.

In operation, surface 58 of flange 13 presses against weld rings 48 and 52 and against seals 54 and 56 when transmitter 10 is bolted to flange 13. The bolting or attachment forces imparted upon the weld rings and seals compress the seals to thereby prevent process fluid from leaking past passageways 24 and 26 and openings 28 and 30. The attachment forces also cause deformation of weld rings 48 and 52. Isolation diaphragms 46 and 50 are positioned either partially between respective weld rings 48 and 52 and surfaces 49 and 53, or immediately adjacent to the weld rings without being positioned between the weld rings and the sensor body support surfaces.

As discussed above, certain pressure transmitters, such as transmitter 10, are sealed to a removable flange 13. Previously, O-ring type seals have been used. More recently, these have given way to Polytetrafluoroethylene (PTFE) based seals. Such seals often take the form of a "confined seal" in which some type of a structure attempts to maintain the shape of the PTFE seal. The seal material is forced to overfill a groove or other recess. A pre-load force is then applied to the seal using bolts or the like, thereby forcing the sealing surfaces closer together and causing the seal material to extrude (cold flow) into the recess. The bolting force creates a tightly held sealing surface and results in a good seal across both temperature and pressure ranges. However, PFTE (or glass filled PTFE) has a tendency to cold flow. This cold flow of the PTFE causes the seal to change shape with time and thereby reduces the effectiveness of the seal. Various confinement methods are used to prevent this cold flow and extrusion and thereby attempt to retain the initial loading force on the sealing surfaces. Typical design guidelines require that the loading force be two times the expected unloading force on a particular joint. Thus, the initial load on the seal, as well as its ability to retain the load, are critical factors in determining the performance of such a seals. These limits are often expressed in performance parameters such as maximum working pressure, process temperature operating extremes, and sealing reliability in cyclic temperature and pressure changes. Further, the sealing areas, bolt sizes, surfaces, and other aspects of the components used with the seal are standardized and thus provide little opportunity to redesign the sealing surfaces in order to improve the sealing characteristics. Thus, in some configurations, cold flow of the PFTE causes the mounting force to lose as much as 30% of its initial pre-load due to temperature cycling. In some instances, an even greater loss may occur due to inconsistent expansion and contraction of components.

Figure 2:
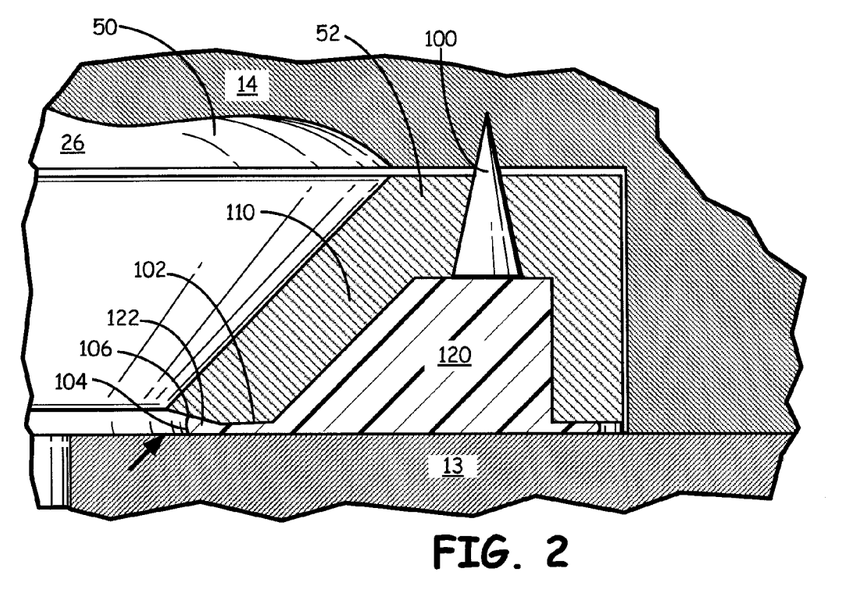
FIG. 2 is a partial cross-sectional view of a seal support structure including a stress riser in accordance with one example configuration.

FIG. 2 is a cross-sectional view of a portion of weld ring 52 in accordance with one example embodiment of the present invention. Weld ring 52 is coupled to sensor body 14 using a weld 100. However, any attachment technique may be employed. Weld ring 52 includes a stress riser 102 defined by a reverse angle 104 in outer circumference wall 106. Stress riser 102 is defined at the outer circumference extension 110 of weld ring 52 which faces passageway 26 and is in contact with process fluid. In the configuration illustrated in FIG. 2, weld ring 52 provides a concentric seal support which includes an annular primary recess 120. Stress riser 102 provides an annular stress riser which, along with outer circumference wall 106 defines an annular inner recess 122. In the region between recess 120, riser 102, inner recess 122 and sensor body 14, a seal material such as PTFE is provided (seal material is illustrated at 54, 56 in FIG. 1). The stress riser 102 provides a load concentration region which, when pressure is applied from process fluid and from the mounting bolts, urges the seal material against flange 13 and contain the seal material to reduce or prevent cold flow. More specifically, seal material contained in recess 122 is urged against stress riser 102 by the applied process pressure. Stress riser 102 ensures that the load applied to the seal material is concentrated to thereby maintain a seal.

Figure 3:
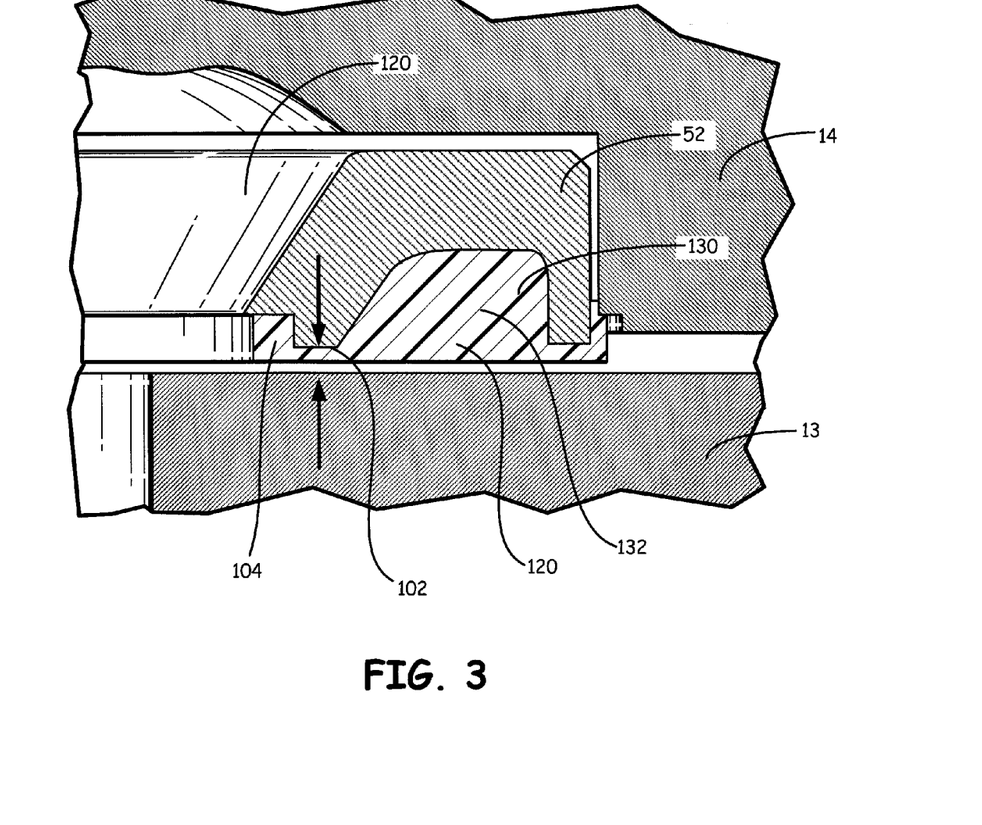
FIG. 3 is a cross-sectional view of another example embodiment of a stress riser formed by a ridge.

FIG. 3 is an enlarged cross-sectional view of another example embodiment of a weld ring 52 including stress riser 102 configured to provide a notch which defines an inner annulus recess 104. Similar to FIG. 2, in FIG. 3 stress riser 102 separates inner annulus recess 104 from primary annulus recess 120. In the configuration shown in FIG. 3, seal material 132 fills recesses 104,120, along with the area between stress riser 102 and flange 13. The riser 102 can be formed by a material removal process such as machining.

Figure 4:
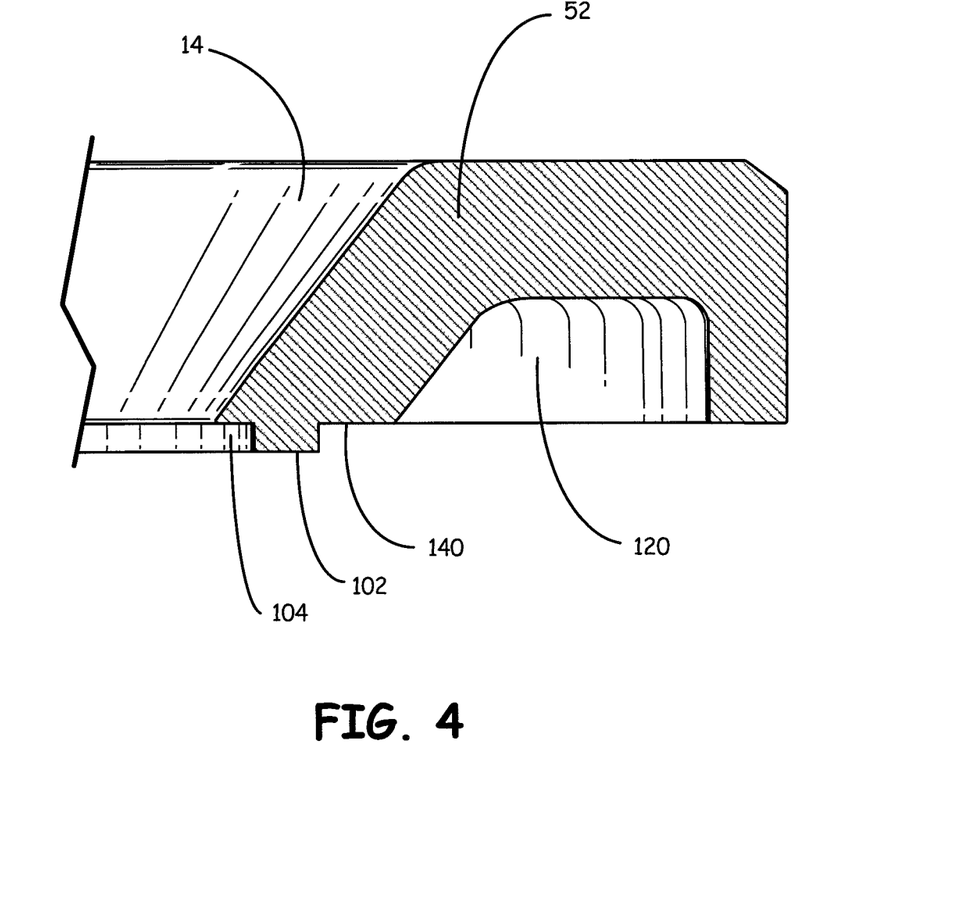
FIG. 4 is an example embodiment showing a seal support structure having a stress riser formed between two recesses.

FIG. 4 shows another example embodiment in which stress riser 102 defines recess region 104 along with a recess region 140. Note that the stress riser 102 may be formed using any desired technique these include, for example, material removal processes, material addition processes, fabrication techniques which provide a bevel, etc. In FIG. 4, the stress riser 102 is formed as an annular ridge around an inner circumference of weld ring 52.

Figure 5:
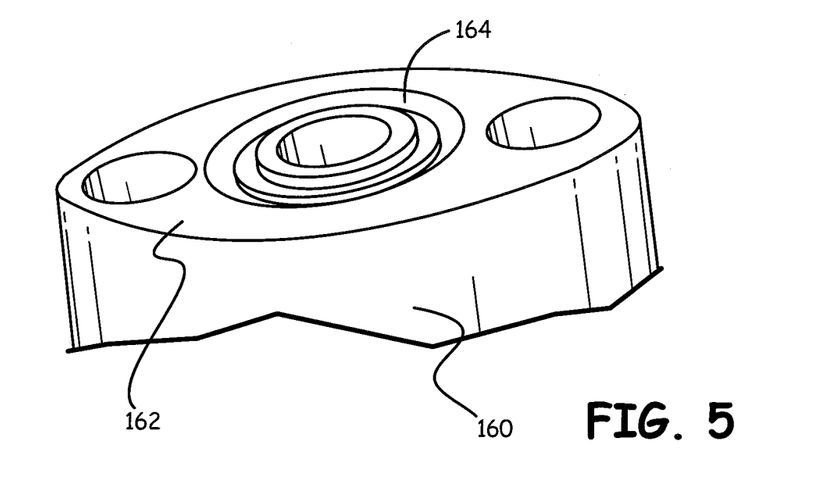
FIG. 5 is a perspective view of a face of process component having a seal support structure formed therein.
Figure 6:
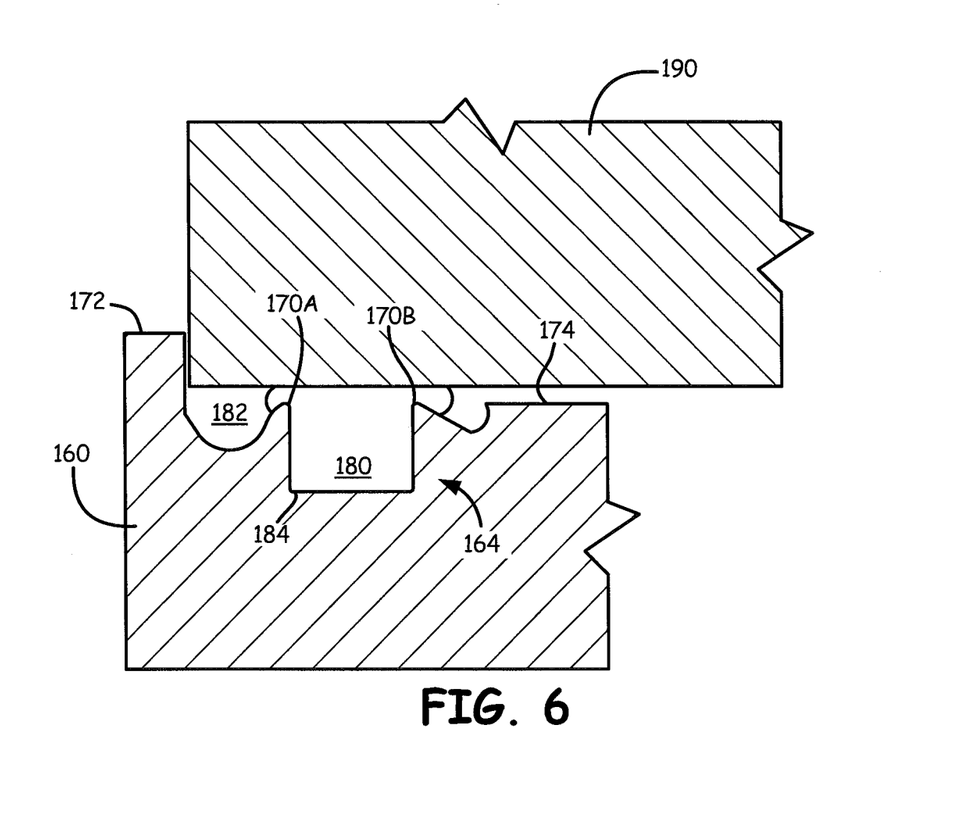
FIG. 6 is a cross-sectional view of a portion of the seal support structure of FIG. 5.
Figure 7:
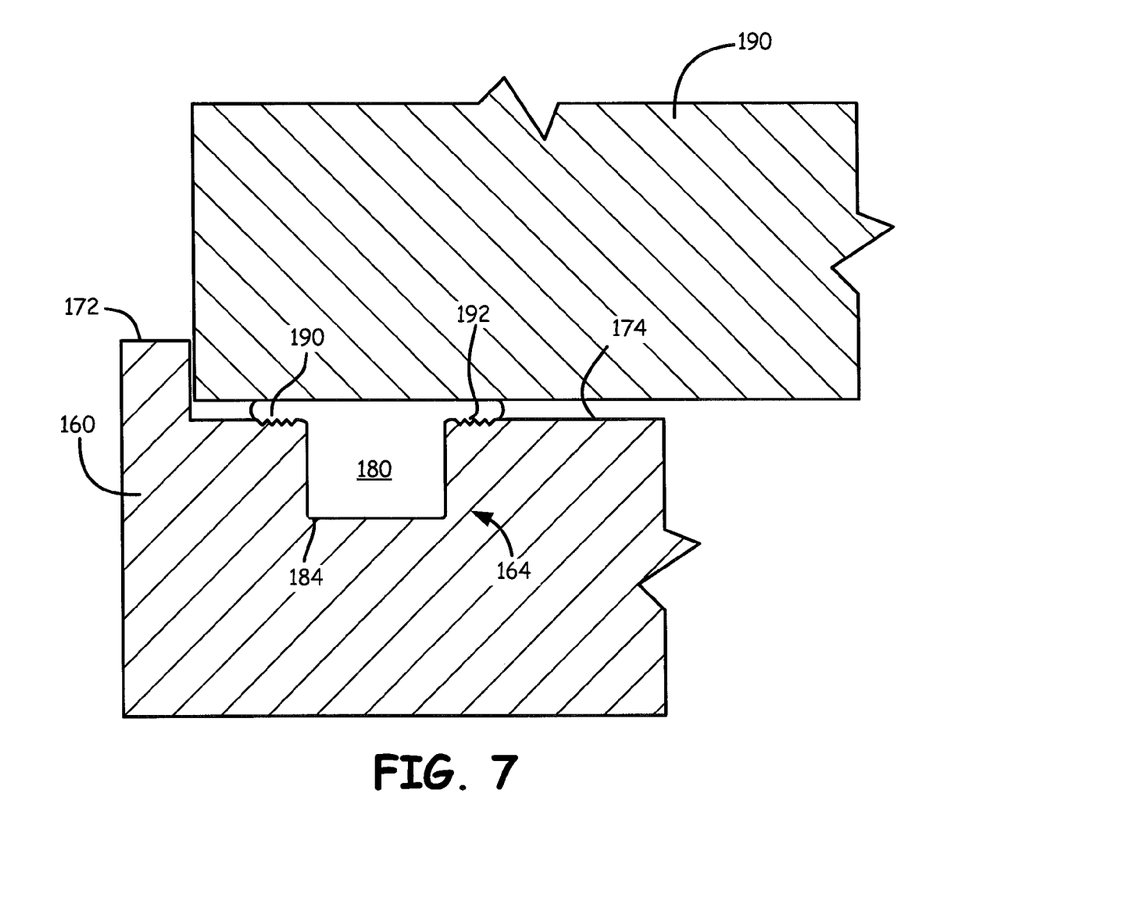
FIG. 7 is a cross-sectional view of another example embodiment of a seal support structure having serrations formed therein.

In the above description, the stress riser 102 is defined in a weld ring. However, the present invention is not limited to this configuration. In some embodiments, the stress riser 102 is defined in a sealing face of a process component. For example, FIG. 5 illustrates a process coupling 160 having a sealing face 162 which provides a concentric seal support structure 164 in accordance with the invention. FIG. 6 is a cross-sectional view process coupling 160 and a flange body 190 showing seal support structure 164 which provides a radially inner and outer stress risers 170A,B defined between an inner annulus lip 172 and an outer annulus lip 174, respectively. Seal material 180 is configured to be received in an inner annulus recess 182 and primary annular recess 184 provided by support structure 164. In a manner similar to that described above, the stress riser 170 receives pressure from process fluid along with the loading pressure and is configured to assist in capturing the seal material 180 and urging the seal material against a face of a process component. FIG. 7 shows a similar configuration in which annular serrations 190 and 192 are provided to localize the stress in the seal material and reduce the amount of cold flow. Serrations 190 and 192 are another example of a respective radial inner and outer stress riser.

The configurations above provide a method and apparatus for sealing two planar faces. The seal is of an annular configuration and a stress riser is provided to contain seal material and urge the seal material against a process face. The seal material may be any appropriate material. Example seal materials include PTFE and graphite. The invention is implemented using a seal support structure which can be configured as a weld ring, or directly in a face of a process interface. Fabrication of the support structure can be based upon molding techniques, material additional or subtraction techniques or other methods as desired. The stress riser allows the loading force to be concentrated in a smaller area thereby improving the seal between the seal material and a process face.

Although the present invention has been described with reference to preferred embodiments, workers skilled in the art will recognize that changes may be made in form and detail without departing from the spirit and scope of the invention. The stress riser of the present invention is configured to increase the force per unit area applied by the seal material to a face of a process component. As used herein the term "weld ring" includes rings which are coupled to a process transmitter or other process component using techniques other than welding.

What is claimed is:

1. A pressure transmitter system for measuring a pressure of a process fluid in an industrial process, comprising:
   a pressure transmitter having a pressure sensor;
   a process fluid passageway having a circular opening configured to couple pressure of the process fluid to the pressure sensor;
   a concentric seal support structure which extends around the circular opening comprising:
      an annular recess;
      an annular stress riser positioned radially inward from the annular recess; and
      a seal material which fills the annular recess and contacts at least a portion of the annular stress riser.

2. The pressure transmitter system of claim 1, wherein the concentric seal support structure includes an annular inner recess positioned radially inward from the annular stress riser and wherein the seal material fills at least a portion of the annular inner recess.

3. The pressure transmitter system of claim 1, wherein the stress riser applies a preload force to the circular opening.

4. The pressure transmitter system of claim 1, wherein the stress riser is fabricated by removing material from the concentric seal support structure.

5. The pressure transmitter system of claim 1, wherein the annular stress riser is formed by a bevel in the concentric seal support structure.

6. The pressure transmitter system of claim 1, wherein the seal material comprises Polytetrafluoroethylene (PTFE).

7. The pressure transmitter system of claim 1, wherein the seal material comprises graphite.

8. The pressure transmitter system of claim 1, wherein the concentric seal support structure is formed in a weld ring mounted to a face of the pressure transmitter.

9. The pressure transmitter system of claim 1, wherein the concentric seal support structure is formed in a face of a process component.

10. The pressure transmitter system of claim 9, wherein the process component comprises a coupling used to couple the pressure transmitter to the process fluid.

11. The pressure transmitter system of claim 1, wherein the seal support structure is configured to reduce cold flow of the seal material.

12. The pressure transmitter system of claim 1, wherein the annular stress riser is configured to increase a force per unit area applied to the seal material.

13. The pressure transmitter system of claim 1, wherein the concentric seal support structure is welded to a body of the pressure transmitter.

14. The pressure transmitter system of claim 1, wherein the annular stress riser comprises serrations configured to reduce cold flow of the seal material.

15. The pressure transmitter system of claim 1, including an outer annular stress riser positioned radially outward from the annular recess.

16. The pressure transmitter system of claim 15, wherein the outer annular stress riser comprises serrations configured to reduce cold flow of the seal material.

17. A method of sealing a process variable transmitter having a pressure sensor to a process fluid, comprising:
   providing an annular stress riser extending around a process coupling;
   providing an annular recess around the stress riser positioned radially outward from the annular stress riser;
   placing a seal material in the annular recess and between the stress riser and a process face; and
   applying a pre-load force which urges the seal material against the process face.

18. The method of claim 17, including fabricating the annular stress riser using a material removal process.

19. The method of claim 17, including forming the annular stress riser using a beveling process.

* * * * *